Sept. 2, 1969          G. CHIEGER          3,464,734
SEMI-TRAILER DOOR AND CORNER POST CONSTRUCTION
Filed Aug. 19, 1966          2 Sheets-Sheet 1
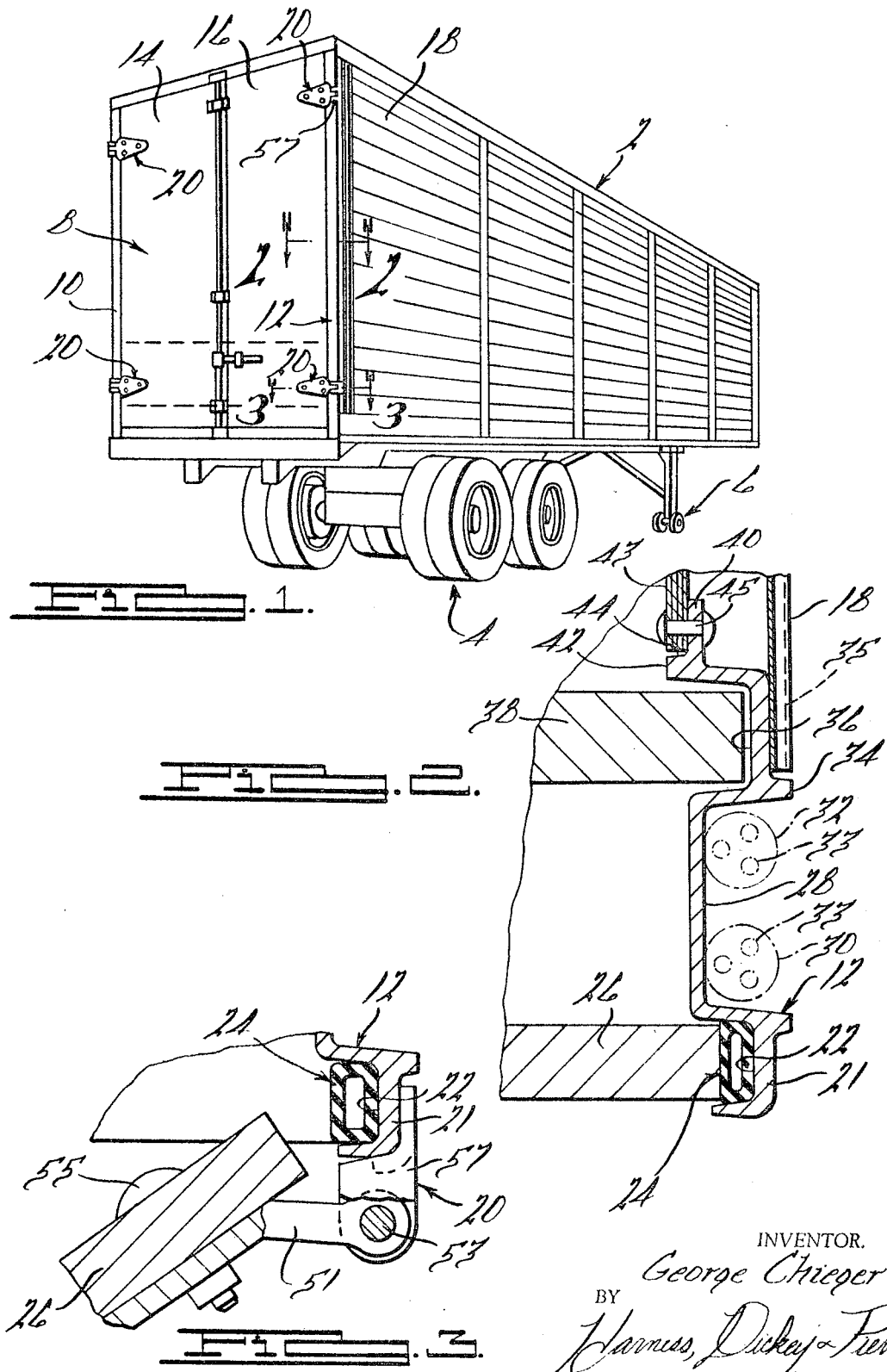
INVENTOR.
George Chieger
BY
Harness, Dickey & Pierce
ATTORNEYS.

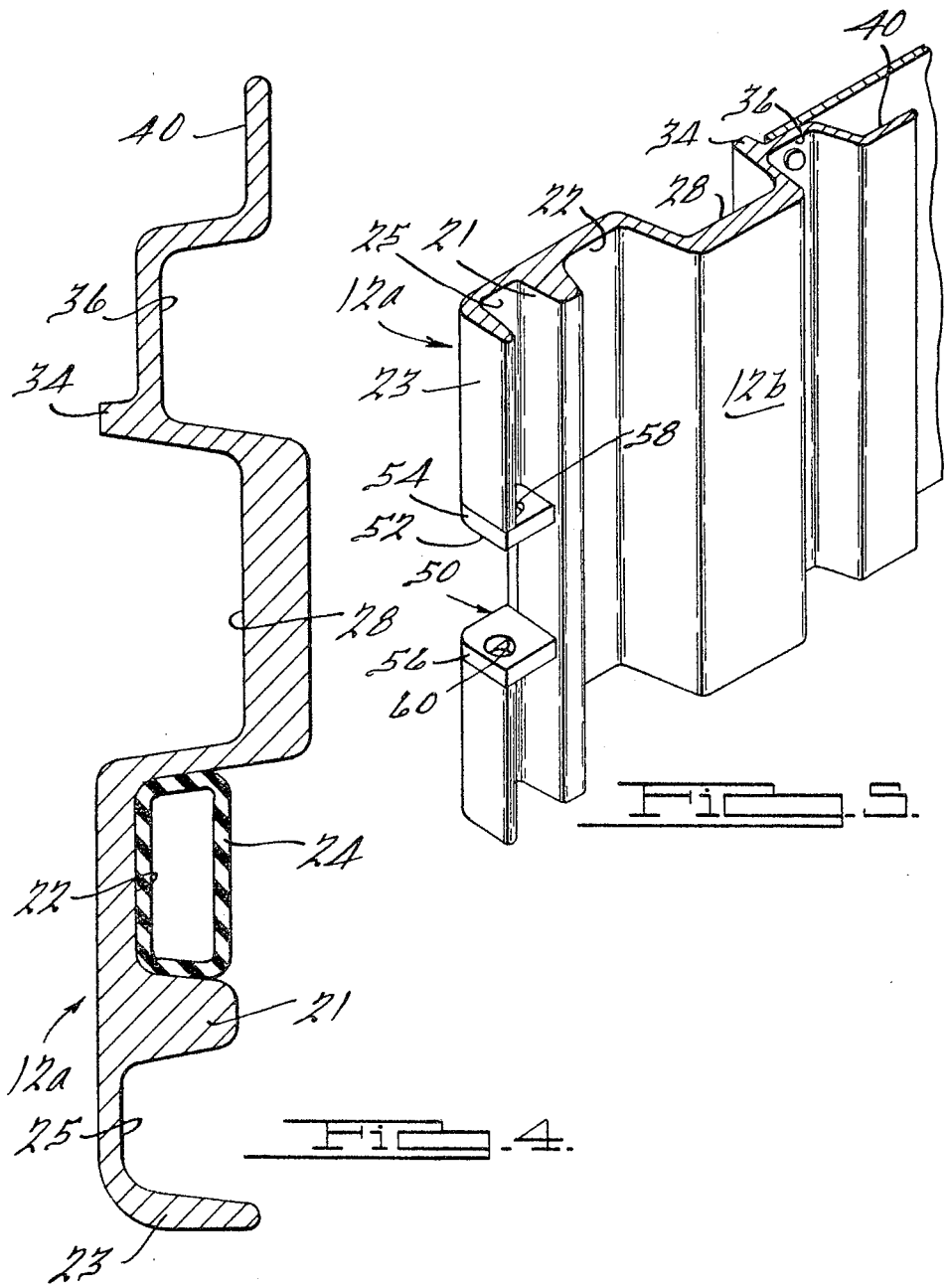

United States Patent Office 3,464,734
Patented Sept. 2, 1969

3,464,734
SEMI-TRAILER DOOR AND CORNER POST CONSTRUCTION
George Chieger, Birmingham, Mich., assignor to Fruehauf Corporation, Detroit, Mich.
Filed Aug. 19, 1966, Ser. No. 573,629
Int. Cl. B62d 25/04
U.S. Cl. 296—50                          11 Claims

ABSTRACT OF THE DISCLOSURE

A door and corner post construction for use on containers, semi-trailers, trucks and the like, comprising: (a) a generally rectangular door frame having (b) a vertical metal door corner post, said post including (c) a metal hinge mounting flange generally extending the length of the corner post, said mounting flange having at least (d) two vertically spaced door hinges secured to said mounting flange, and (e) a compressible seal located within (f) a first recess defined by said mounting flange in conjunction with the corner post (g) a door mounted on said hinges for rotation relative to said door frame whereby said door when in closed position contacts and compresses said seal, (h) a second recess disposed on said corner post and generally extending the length thereof parallel to said first recess, said second recess being located on the same side of the corner post relative to the hinge mounting flange and spaced therefrom, and said second recess being adapted to hold in position a board which prevents forces from inside of the door structure and directed toward said door from making any contact therewith.

---

This invention relates to an improved door construction for use on trailers and the like. More particularly, this invention relates to a door construction for trailers whereby structure joinder of the door, corner post, and side walls of the trailer are brought about in an easy and practical fashion, and wherein said structural joinder provides for concealment of the sidewall construction of the trailer as well as provision of means whereby rearwardly directed forces by the cargo within the trailer are absorbed by the structure of the corner post and not the trailer door hinges, which are of course more susceptible to damage by the rearward forces caused by shifting of the cargo load.

In the past, door and corner post constructions for trailer have been known which to a certain extent satisfactorily prevent rearward forces from damaging the door hinges. For example see U.S. Patent No. 3,210,118 issued Oct. 5, 1965 which describes a door construction utilizing "bull board" to absorb the impact of outwardly directed forces caused by the shifting of the cargo load when the trailer is placed on a railway flatcar, as so often happens in modern times incident to long distance shipment of highway trailers and their contents. However, in prior door constructions, the means or bull board used to accept forces directed against the door by shifting of the cargo, have not been completely satisfactory for the reason that the bull board has been located on the exterior side of the door and also because the bull board cannot be positioned exactly correctly to prevent a load within the interior of the trailer from shifting and exerting an undue pressure against the hinge structure of the door. In addition, prior door constructions have not been provided with a structure such that they can be easily joined up with the side wall portions of the trailer in order to give a strong structural joinder with the side wall as well as to conceal the structure of the side wall which, if left exposed, detracts from the appearance of the trailer and causes snagging with objects coming into contact with the side of the trailer. Moreover, prior door constructions have not made provision for electrical conduits and the like, which are numerous at the rear of a tractor trailer due to highway lights, turn signals, stop lights, etc. positioned on the rear of the trailer for safe travel under conditions of low visibility such as in the night time, under heavy fog conditions, or the like.

In view of all the above, it is an object of the present invention to provide an improved door constuction for trailers and the like.

Another object of the invention is to provide an improved door construction for trailers which enables a practical and easily facilitated structural connection between the trailer side wall, the door corner post, and the door on the trailer, which structural connection provides the trailer with clean cut lines of design while at the same time hiding the end construction of the trailer side wall with respect to exterior visibility.

Another object of the present invention to provide an improved door construction for trailers wherein forces directed against the door from the interior of the trailer due to shifting of the cargo are prevented from contacting the door of the trailer due to preventive means accepting said forces located within the interior of the trailer.

Another specific object of the present invention is to provide an improved door construction for trailers which has structural means enabling an easy joinder of the corner post with the side wall of the trailer, as well as a recess associated with the corner post of the trailer door providing for electrical conduits to be positioned all or part of the way along the length of the corner post, as well as preventive means to accept rearward forces by shifting of cargo and thereby eliminate damage to the door hinges.

Other objects, features and advantages of the present invention will become apparent from the subsequent description and the appended claims, taken in conjunction with the accompanying drawings wherein like numerals indicate like elements, and in which:

FIGURE 1 illustrates a highway semi-trailer for use on highways and turnpikes and also suitable for utilization by placing on a railway flat car for long cross country hauls;

FIGURE 2 illustrates a cross sectional view along the line 2—2 of FIG. 1, showing how the door corner post construction is structurally associated with the side wall of the trailer as well as the association of the corner post with the trailer doors;

FIGURE 3 is a cross section view along line 3—3 of FIG. 1, illustrating the hinge assembly for pivoting the trailer doors with respect to the overall door construction;

FIGURE 4 illustrates another alternative embodiment of the door and corner post construction of this invention in cross sectional view; and FIGURE 5 shows an elevated view of a lower segment of the corner post of FIG. 4 illustrating a hinge connecting portion by which the trailer door is attached to the corner post.

In order to more fully describe the invention, reference is now made to FIGURE 1 which shows a highway semi-trailer generally designated 2, having a wheel suspension 4 and front balancing means 6 for use when the trailer is disconnected from the tractor, not shown. At the rear of the trailer there is illustrated the improved door construction in accordance with the invention generally designated 8, which is comprised of two upstanding vertical corner posts 10 and 12 which serve as a structural joinder for the pivotally mounted doors 14 and 16 to the side walls 18 of the trailer by means of the hinges 20.

FIGURE 2, a cross section view along line 2—2 from FIG. 1, illustrates more clearly the construction of the corner post 12, which is the same as corner post 10 except for the difference between right and left hand orientation. The corner post 12 may be made of extruded steel or aluminum; also, in certain preferred instances, the corner post may be made from rolled steel, and all of these materials are advantageous for a structurally sound corner post. The corner post comprises an end flanged portion 21 which has a recess 22 therewithin for holding a compressible seal 24 which is compressed laterally against the flange portion 21 by closing the door 26 of the trailer adjacent the flange portion 21. In a direction toward the interior of the trailer there is disposed a second recess 28 on the corner post which recess 28 provides the function of accepting electrical conduits for disposition on the side of the trailer in order to service the electrical lighting such as turn signals, brake lights, highway lights, etc., on the rear of the trailer. Shown within the recess 28 in dotted phantom lines are the electrical conduits 30 and 32 containing electrical wires 33. The corner post 12 also contains a rib portion 34 disposed on that end of the recess 28 which generally comes into structural contact with the side wall 18 of the trailer. The rib 34 on the corner post acts as an abutment to facilitate structural joinder between the corner post and the trailer side wall 18, while at the same time rib 34 acts to hide the corrugations on the side wall 18 from view on the exterior of the trailer. The low point of the corrugations in the side wall is indicated by dotted line 35 in FIG. 2, and generally a side wall 18 of this type would be made from a material such as corrugated aluminum or like corrugated material. Adjacent the rib portion 34 of the corner post there is positioned an open, inwardly directed recess 36 adapted for the receipt and holding of a bull board 38, which is held in place by a corresponding recess on the opposite corner post 10. It will be noted that the bull board on the interior of the trailer extends across the interior of the trailer between the corner posts 10 and 12 such that it is able to function in receiving the rearwardly directed loads resultant from shifting of the cargo within the trailer before such forces contact the trailer doors, to thereby prevent the forces from the shifting loads from striking against the trailer door and the hinges in connection therewith which are, of course, more susceptible to damage. The bull board may be removed from positioning within the recesses 36 by removal slots, not shown, at the top of the corner posts or equivalent removal means. One or more bull boards may be used in the recesses and the boards may be held at any height within the recesses through the use of pins stuck in the recesses and the like. A flange portion 40 is positioned adjacent the recess 36 used to hold the bull board and the flange portion 40 is provided with a rib 42 which is adapted for abutment against the interior side wall 43 of the trailer. The interior wall 43 of the trailer may be of a material such as, for example, ¼ inch plywood or the like. The flange portion 40 and the rib 42 define an L-shaped portion 44 for structural abutment with the interior wall 43 and flange 40 and the interior wall 43 may be joined by suitable means such as a bolt 45 or the like. The rib 42 on the inner edge of the corner post 12 in addition to providing a structural abutment for the interior wall 43 also functions as a closeout which hides the end of the interior wall 43 from view and prevents the wall 43 from being damaged, scraped or marred when loading the cargo contents of the trailer.

FIGURE 3 shows a cross sectional view along line 3—3 of FIG. 1 and illustrates how hinge assembly 20 is connected to the flange 21 by means of a weld, bolts, or the like, not shown. The hinge 20 enables pivoting of the door 26 about the corner post through the mounting of the hinge plate 51 on the vertical hinge pins 53. The hinge plates 51 are attached to the door 26 through the use of means such as the bolts 55, the hinge pins 53 are vertically mounted within the U-shaped member 57.

FIGURE 4 shows an alternative embodiment for the corner post of the invention indicated as 12a wherein an additional flange member 23 is attached in outwardly extending fashion to member flange 21. Flange 23 runs generally parallel to flange 21 and in conjunction therewith forms a recess 25 which extends substantially the length of the corner post 12. Similar to the corner post of FIG. 2 except for the difference between the right and left hand orientation, flange 21 contains a recess 22 therewithin for holding compressible seal 24 in position and this seal is compressed laterally against recess 22 upon closing of the trailer door. In a direction toward the interior of the trailer utilizing corner post 12a of FIG. 4 there is disposed a second recess 28 to provide the function of accepting electrical conduits and the like for disposition on the side of the trailer. Corner post 12a also contains a rib portion 34 disposed on that end of the recess 28 which generally comes into structural connection with the outer side wall of the trailer. Adjacent the rib portion 34 there is positioned an inwardly directed recess 36 for holding a bull board, not shown, in position. There is also shown a flange portion 40 positioned adjacent the recess 36. Flange 40, for example, enables connection of the corner post with an interior side wall of the trailer by any suitable means.

FIGURE 5 illustrates a lower portion 12b of the corner post 12a of FIG. 4 demonstrating how one or more protected hinge connections generally designated 50 can be made within the recess 25 such that the hinge is connected to the flange 21 by welding or the like while at the same time being disposed within the recess 25. The hinge connection 50 is formed within a cut-away area 52 of the flange 23. The cut-away area of the flange 23 enables an upper plate 54 and a lower plate 56 to be fixed in position, by welding or the like, such that they are connected to the flange 21 and also the flange 23. The upper and lower plates 54 and 56 are provided with vertically aligned hinge pin holes 58 and 60 respectively. The pin holes 58 and 60 enable the pivotal connection of a hinge and door, not shown, to the corner post 12a.

In accordance with the corner post embodiment shown in FIGURES 4 and 5 it should be apparent that in addition to the advantages of the invention already referred to, corner post 12a provides the further advantage of a hinge connecting structure 50 which is protected from damage due to exterior forces directed against the hinge because of the fact that the hinge is shielded within the recessed portion 25 formed between flanges 21 and 23.

What is claimed is:

1. A construction for use ase a door structure on trucks, trailers, containers and the like comprising: (a) a generally rectangular door frame having (b) a vertical metal door corner post, said post including (c) a metal hinge mounting flange generally extending the length of the corner post, said mounting flange having at least (d) two verticaly spaced door hinges secured to said mounting flange, and (e) a compressible seal located within (f) a first recess defined by said mounting flange in conjunction with the corner post (g) a door mounted on said hinges for rotation relative to said door frame whereby said door when in closed position contacts and compresses said seal, (h) a second recess disposed on said corner post and generally extending the length thereof parallel to said first recess, said second recess being located on the same side of the corner post relative to the hinge mounting flange and spaced therefrom, and said second recess being adapted to hold in position a board which prevents forces from inside of the door structure and directed toward said door from making any contact therewith.

2. The construction of claim 1 further characterized as having:
a third recess for electrical conduits generally parallel to said first and second recesses and disposed therebetween on said corner post.

3. The construction of claim 2 further characterized as having:

a rib located on an outer side of said corner post relative to said door frame, said rib being adapted for structural abutment with an exterior side wall to be secured to said door frame.

4. The construction of claim 3 further characterized as having:

a second rib located on an inner side of said corner post relative to said door frame, said rib being adapted for structural abutment with an interior side wall to be secured to said door frame.

5. The construction of claim 3 further characterized as additionally having:

a hinge protecting flange connected to said hinge mounting flange and generally extending the length thereof, and wherein said corner post is made of rolled steel.

6. The construction of claim 1 further characterized as having:

a hinge protecting flange connected to said hinge mounting flange and generally extending the length thereof.

7. A construction for use as a door structure on trucks, trailers, containers and the like comprising: (a) a generally rectangular door frame having (b) a vertical door corner post, said post having a cross section wherein thickness of the post varies from place to place about the cross-section due to formation of the post from rolled metal, (c) a hinge mounting flange generally extending the length of the corner post, said mounting flange having at least (d) two vertically spaced door hinges secured to said mounting flange, and (e) a compressible seal located within (f) a first recess defined by said mounting flange in conjunction with the corner post (g) a door mounted on said hinges for rotation relative to said door frame whereby said door when in closed position contacts and compresses said seal, (h) a second recess disposed on said corner post and generally extending the length thereof parallel to said first recess, said second recess being located on the same side of the corner post relative to the hinge mounting flange and spaced therefrom, and (i) an oppositely facing third recess generally parallel to said first and second recesses and disposed therebetween on said corner post.

8. The construction of claim 7 further characterized as having: a hinge protecting flange connected to said hinge mounting flange and generally extending the length thereof.

9. The construction of claim 7 further characterized as having: a rib located on an outer side of said corner post relative to said door frame, said rib being adapted for structural abutment with an exterior side wall to be secured to said door frame.

10. The construction of claim 9 further characterized as having: a second rib located on an inner side of said corner post relative to said door frame, said rib being adapted for structural abutment with an interior side wall to be secured to said door frame.

11. The construction of claim 10 further characterized as additionally having: a hinge protecting flange connected to said hinge mounting flange and generally extending the length thereof, and wherein said corner post is made of rolled steel.

References Cited

UNITED STATES PATENTS

| 353,037 | 11/1886 | Peters | 49—63 |
| 1,387,059 | 8/1921 | McAllister | 49—464 |
| 2,567,652 | 9/1951 | Parker et al. | 49—464 X |
| 2,991,116 | 7/1961 | Andrews. | |
| 3,070,400 | 12/1962 | Rivers. | |
| 3,210,118 | 10/1965 | Chieger. | |
| 3,000,666 | 9/1961 | Fernandes | 296—106 |

FOREIGN PATENTS 899,180  6/1962  Great Britain.

LEO FRIAGLIA, Primary Examiner

JOHN A. PEKAR, Assistant Examiner

U.S. Cl. X.R.

49—383, 489, 504